(12) United States Patent
Wang et al.

(10) Patent No.: US 8,412,694 B2
(45) Date of Patent: Apr. 2, 2013

(54) COLORBLIND ACCESSIBLE IMAGE SEARCH

(75) Inventors: Meng Wang, Beijing (CN); Linjun Yang, Beijing (CN); Xian-Sheng Hua, Beijing (CN)

(73) Assignee: Microsoft Corporation, Redmond, WA (US)

( * ) Notice: Subject to any disclaimer, the term of this patent is extended or adjusted under 35 U.S.C. 154(b) by 638 days.

(21) Appl. No.: 12/355,795

(22) Filed: Jan. 18, 2009

(65) Prior Publication Data

US 2010/0185624 A1 Jul. 22, 2010

(51) Int. Cl.
*G06F 7/00* (2006.01)
*G06F 17/30* (2006.01)

(52) U.S. Cl. ......... 707/706; 707/722; 707/723; 707/732

(58) Field of Classification Search .................. None
See application file for complete search history.

(56) References Cited

U.S. PATENT DOCUMENTS

| | | | | |
|---|---|---|---|---|
| 6,081,276 | A * | 6/2000 | Delp .............................. | 345/589 |
| 6,594,386 | B1 | 7/2003 | Golshani et al. | |
| 6,714,963 | B1 | 3/2004 | Levine et al. | |
| 7,394,468 | B2 | 7/2008 | Hofman et al. | |
| 2002/0065658 | A1* | 5/2002 | Kanevsky et al. ............ | 704/260 |
| 2005/0160065 | A1 | 7/2005 | Seeman | |
| 2006/0139312 | A1 | 6/2006 | Sinclair et al. | |
| 2006/0204142 | A1 | 9/2006 | West et al. | |
| 2006/0248073 | A1 | 11/2006 | Jones et al. | |
| 2008/0027913 | A1 | 1/2008 | Chang et al. | |

OTHER PUBLICATIONS

J. van de Weijer, C. Schmid, and J. Verbeek. Learning color names from real-world images. In CVPR, 2007.*
Ingemar J. Cox, Matthew L. Miller, Thomas P. Minka, Thomas Papathomas, and Peter N. Yianilos, The Bayesian image retrieval system, PicHunter: Theory, implementation and psychophysical experiments, IEEE Transactions on Image Processing (to appear), 2000.*

(Continued)

*Primary Examiner* — Jay Morrison
(74) *Attorney, Agent, or Firm* — Lyon & Harr, LLP; Richard T. Lyon

(57) ABSTRACT

Colorblind accessible image search technique embodiments are presented that re-rank the results of a relevance-ranked image search to account for the accessibility of the images to a colorblind person. This is accomplished by first computing a colorblind accessibility quantity for each image of interest in the search results. A colorblind accessibility quantity quantizes the degree to which color information is preserved when an image is perceived by a colorblind person viewing the image. It is computed by generating a colorblind version of an image that simulates how the image would appear to the colorblind person. An amount quantifying the loss of color information between the image and the colorblind version of the image is then estimated. This estimate is used to compute the colorblind accessibility quantity for the image. Once the colorblind accessibility quantities have been computed, the image search results are re-ranked based on these quantities.

11 Claims, 2 Drawing Sheets

OTHER PUBLICATIONS

Alman, D. H., R. S. Berns, T. F. Chong, E. Hita, T. Kehlibarov, H. Komatsubara, T. O. Maier, R. MacDonald, C. D. Reilly, A. R. Robertson, R. Séve, H. S. Shah, K. J. Smith, K. Witt, Industrial colour-difference evaluation, CIE 116-1995, Int'l Commission on Illumination, retrieved Nov. 25, 2008, pp. 1-17.

Brajnik, G., Measuring web accessibility by estimating severity of barriers, Web Information Systems Engineering—WISE 2008 Workshops, Sep. 2008, pp. 112-121.

Brettel, H., F. Viénot, J. D. Mollon, Computerized simulation of color appearance for dichromats, J. Opt. Soc. America, Oct. 1997, vol. 14, No. 10, pp. 2647-2655.

Flück, D., ColorBlindExt—Better web accessibility for colorblind users, Jun. 20, 2007, available at http://www.colblindor.com/2007/06/20/colorblindext-better-web-accessibility-for-colorblind-users/, pp. 1-4.

Fogarty, J., D. S. Tan, A. Kapoor, S. Winder, CueFlik: Interactive concept learning in image search, Proc. of ACM CHI 2008, Apr. 2008, pp. 29-38, Florence, Italy.

Google, Inc., Google accessible web search for the visually impaired, retrieved Nov. 24, 2008 from http://labs.google.com/accessible/, pp. 1.

Huang, J.-B., Y.-C. Tseng, S.-I. Wu, S.-J. Wang, Information preserving color transformation for Protanopia and Deuteranopia, IEEE Signal Proc. Letters, Oct. 2007, vol. 14, No. 10, pp. 711-714.

Iaccarino, G., D. Malandrino, M. D. Percio, V. Scarano, Efficient edge-services for colorblind users, Proc. of the 15th Int'l Conf. on World Wide Web, May 2006, pp. 919-920.

Jefferson, L., R. Harvey, Accommodating color blind computer users, Proc. of the 8th Int'l ACM SIGACCESS Conf. on Computers and Accessibility, Oct. 2006, pp. 40-47, ACM New York, NY, USA.

Jefferson, L., R. Harvey, An interface to support color blind computer users, Proc. of the 2007 Conf. on Human Factors in Computing Systems, Apr. 28-May 3, 2007, pp. 1535-1538.

Kovalev, V. A., Towards image retrieval for eight percent of colorblind men, 17th Int'l Conf. on Pattern Recognition, Aug. 2004, pp. 943-946, IEEE Computer Society.

Live image search, retrieved Nov. 24, 2008 from http://image.live.com, pp. 1.

Maven, R., How search results are re-ranked, Econsultancy, Oct. 2006, pp. 1-4.

Rasche, K., R. Geist, J. Westall, Re-coloring images for gamuts of lower dimension, Comp. Graph. Forum, Aug.-Sep. 2005, pp. 423-432, vol. 24, No. 3.

Takamoto, Y., H. Tosaka, Web accessibility diagnosis tools, FUJITSU Sci. Tech. J., Apr. 2005, pp. 115-122.

Vischeck, retrieved Nov. 24, 2008 from http://www.vischeck.com/, pp. 1.

Wakita, K., K. Shimamura, SmartColor: Disambiguation framework for the colorblind, Proceedings of the ACM SIGACCESS Conference on Computers and Accessibility, ASSETS 2005, Oct. 9-12, 2005, pp. 158-165, Baltimore, MD, USA.

WEBAIM, AIS accessibility toolbar, retrieved Nov. 24, 2008 from http://www.webaim.org/resources/ais/, pp. 1-7.

Wikipedia, Accessiblity, retrieved Nov. 24, 2008 from http://en.wikipedia.org/wiki/Accessibility, pp. 1-7.

Yang, S., and Y. M. RO, Visual content adaptation for color vision deficiency, Proc. Int. Conf. Image Processing, Sep. 2003, pp. 453-456.

IBM, Accessibility research: aDesigner, retrieved Nov. 24, 2008 from http://researchweb.watson.ibm.com/tri/projects/acc_tech/adesigner_e.htm, pp. 1-2.

* cited by examiner

COLORBLIND ACCESSIBLE IMAGE SEARCH

BACKGROUND

Colors are widely used in multimedia content to convey visual information. However, around 5%-8% of men and 0.8% of women have certain kinds of colorblindness, i.e., have difficulty in discriminating certain color combinations and color differences.

Colors are perceived by a human with the cones of the eyes absorbing photons and sending electrical signals to the brain. According to their peak sensitivity, these cones can be categorized into Long (L), Middle (M) and Short (S), which absorb long wavelengths, medium wavelengths and short wavelengths, respectively. Consequently, light is perceived as three members: (l, m, s) where l, m, and s represent the amount of photons absorbed by L-, M- and S-cones, respectively. More formally, color stimulus ($S_i$) for a light can be computed as the integration over the wavelengths $\lambda$:

$$S_i = \int \phi(\lambda) l_i(\lambda) d\lambda, i = L, M, S; \qquad (1)$$

where $\phi$ stands for power spectral density of the light, $l_L$, $l_M$, and $l_S$ indicate L-, M- and S-cones.

Colorblindness, formally known as color vision deficiency, is caused by the deficiency or lack of certain types of cones. Those who have only two types of cones are referred to as dichromats. There are three types of dichromats: namely protanopes, deuteranopes, and tritanopes, which indicate the lack of L-cones, M-cones and S-cones, respectively. Protanopes and deuteranopes have difficulty in discriminating red from green, whereas tritanopes have difficulty in discriminating blue from yellow. Most dichromats belong to either the protanopia or deuteranopia types.

SUMMARY

Colorblind accessible image search technique embodiments described herein generally involve re-ranking the results of a relevance-ranked image search to account for the accessibility of the images to a colorblind person. In one embodiment, this is accomplished by first computing a colorblind accessibility quantity for each image of interest in the search results. A colorblind accessibility quantity quantifies the degree to which color information is preserved when an image is perceived by a colorblind person viewing the image. In one implementation, it is computed by generating a colorblind version of an image that simulates how the image would appear to the colorblind person. An amount quantifying the loss of color information between the image and the colorblind version of the image is then estimated. This estimate is then used to compute the colorblind accessibility quantity for the image. Once the colorblind accessibility quantities have been computed, the image search results are re-ranked based on these quantities.

It should be noted that this Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

The specific features, aspects, and advantages of the disclosure will become better understood with regard to the following description, appended claims, and accompanying drawings where:

DETAILED DESCRIPTION

In the following description of colorblind accessible image search technique embodiments reference is made to the accompanying drawings which form a part hereof, and in which are shown, by way of illustration, specific embodiments in which the technique may be practiced. It is understood that other embodiments may be utilized and structural changes may be made without departing from the scope of the technique.

1.0 Colorblind Accessible Image Search Technique

Colorblind accessibility of an image for the purposes of the colorblind accessible image search technique embodiments described herein generally refers to the degree to which an image can be perceived by a colorblind individual. Generally, the colorblind accessibility of an image involves two factors: the quality of the original image and if significant information has lost in colorblind perception. Assuming a high quality image, the colorblind accessible image search technique embodiments described herein focus on the second factor. In general, even high quality images can have low accessibility due to the color information loss perceived by a colorblind person. Thus, the results of a relevance-ranked electronic database search (e.g., a web search) for images would likely present images high up in the relevance rankings that would not be readily perceptible to a color blind person. The colorblind accessible image search technique embodiments described herein identify and re-rank search results so that they can be well perceived by colorblind users. In this way the search results are made more accessible.

Figure 1:
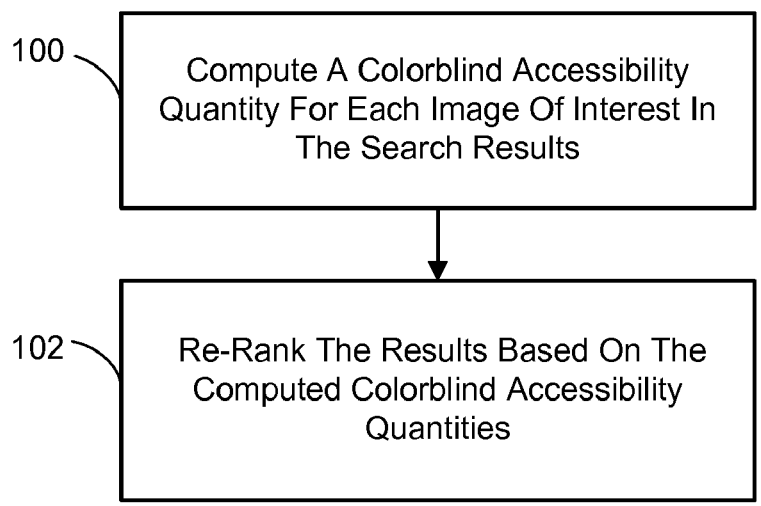
FIG. 1 is a flow diagram generally outlining one embodiment of a process for re-ranking the results of a relevance-ranked image search to account for the accessibility of the images to a colorblind person.

More particularly, referring to FIG. 1, in one embodiment, the identification and re-ranking is accomplished as follows. First, a colorblind accessibility quantity is computed for each image of interest in the search results (100). Then, the results are re-ranked based on the computed colorblind accessibility quantities (102). In the following sections, ways in which the colorblind accessibility quantity can be computed, as well as different customizable re-ranking techniques, will be described in more detail.

1.1 Colorblind Accessibility Quantity Computations

Figure 2:
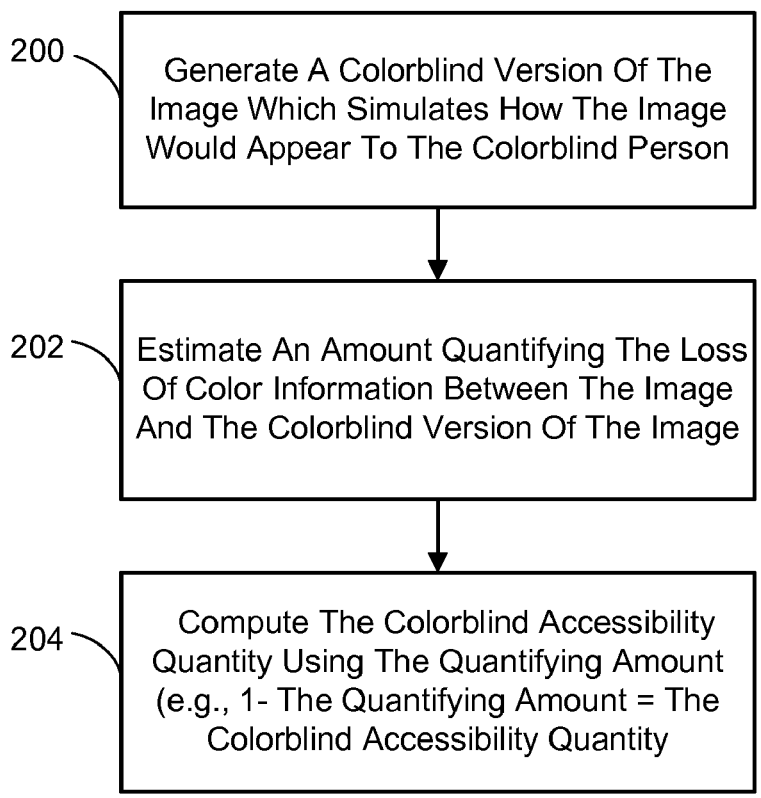
FIG. 2 is a flow diagram generally outlining one embodiment of a process for quantizing a degree to which color information is lost when an image is perceived by a colorblind person viewing the image.

In general, computing the colorblind accessibility quantity for an image involves quantizing the degree to which color information is lost when an image is perceived by a colorblind viewer. In one embodiment, this is accomplished as illustrated in FIG. 2, by first generating a colorblind version of the image which simulates how the image would appear to the colorblind person (200). An amount quantifying the loss of color information between the image and the colorblind version of the image is then estimated (202). This quantifying amount is then used to compute the colorblind accessibility quantity (204). In one implementation, the colorblind accessibility quantity is computed as one minus the quantifying amount.

In regard to generating a colorblind version of an image, this can be done using any of the various existing techniques for simulating how a colorblind person would view an image. It is noted that the technique employed would be tailored to produce a colorblind version of an image that corresponds to the type of colorblindness the intended viewer suffers from.

Once the colorblind version of an image is generated, it is compared to the original image to compute the color information loss. In one embodiment, this is accomplished using the following two evaluation criteria: color distinguish-ability loss and color entropy loss. The color distinguish-ability loss ($Loss_1$) is formulated as:

$$Loss_1 = \frac{1}{n^2} \sum_{i=1}^{n-1} \sum_{j=i+1}^{n} \|\Delta(c_i, c_j) - \Delta(\pi(c_i), \pi(c_j))\|^2; \quad (2)$$

where n refers to the total number of pixels in each image (which is assumed to be the same), $\Delta(c_i, c_j)$ indicates the difference between the colors of pixels $c_i$ and $c_j$ at pixel locations i and j, and $\Delta(\pi(c_i),\pi(c_j))$ indicates the difference between the simulated colors of the pixels of the colorblind image $\pi(c_i)$ and $\pi(c_j)$ at pixel locations i and j. In effect, Eq. (2) measures if the difference between color pairs has been preserved in the colorblind image. In one embodiment, the CIE94 color difference method is adopted for the purposes of computing the forgoing pixel color differences. This method computes a weighted Euclidean distance in LCH (luminance, chroma, hue) color space. However, other color difference computation methods could be employed instead, as desired.

For the sake of computational efficiency, in one implementation of the color distinguish-ability loss computation, the RGB color space of the image and the colorblind version of the image are equally quantized into Q bins. Thus, Eq. (2) becomes:

$$Loss_1 = \frac{1}{n^2} \sum_{i=1}^{Q-1} \sum_{j=i+1}^{Q} n_i n_j \|\Delta(c_i, c_j) - \Delta(\pi(c_i), \pi(c_j))\|^2. \quad (3)$$

where $n_i$ refers to the number of pixels that belong to the i-th bin, $n_j$ refers to the number of pixels that belong to the j-th bin, $\Delta(c_i, c_j)$ indicates the difference between the quantized colors $c_i$ and $c_j$ in bins i and j associated with the image, and $\Delta(\pi(c_i), \pi(c_j))$ indicates the difference between the quantized simulated colors $\pi(c_i)$ and $\pi(c_j)$ in bins i and j associated with the colorblind version of the image.

The other evaluation criteria, namely the color entropy loss ($Loss_2$) is computed as:

$$Loss_2 = \frac{-\sum_{i=1}^{Q-1} \frac{n_i}{n} \log \frac{n_i}{n} + \sum_{i=1}^{Q-1} \frac{n'_i}{n} \log \frac{n'_i}{n}}{-\sum_{i=1}^{Q-1} \frac{n_i}{n} \log \frac{n_i}{n}}; \quad (4)$$

where $n_i'$ represents the pixels that belong to the i-th bin in the colorblind image. In effect, Eq. (4) measures if many colors are lost in the colorblind transformation. It is noted that in tested embodiments, a Q of 4096 was determined via empirical means and used successfully. However, it is envisioned that Q could range between 1 and 16,777,216, depending on the application. The Q parameter value can be prescribed. In addition, in one implementation, the Q parameter value is changeable and can be selected by the user.

In one embodiment, the two loss measurements are linearly combined to produce the overall color information loss, e.g., $$Loss = \alpha Loss_1 + (1-\alpha) Loss_2, \quad (5)$$

where α is a weighting factor. In tested embodiments, an α of 0.5 was determined via empirical means and used successfully. However, it is envisioned that α could range between 0 and 1, depending on the application. The α parameter value can be prescribed. In addition, in one implementation, the α parameter value is changeable and can be selected by the user.

Based on the overall color information loss measurement, the aforementioned colorblind accessibility quantity of an image is defined as:

$$Accessibility = 1 - Loss. \quad (6)$$

It is noted that while the use of a linear combination of the color distinguish-ability loss and color entropy loss measurements produces acceptable results, other options are available. First, other known combination methods could be employed, rather that the above-described linear method. In addition, depending on the application, using just the color distinguish-ability loss measurement or just the color entropy loss measurement to represent the overall color information loss, rather than a combination of the two, could produce acceptable results with less processing costs.

It is also noted that the colorblind accessibility quantity can be computed in advance of a search and associated with an image. It is also envisioned that multiple colorblind accessibility quantities could be computed for and associated with an image in advance of a search. Each of these colorblind accessibility quantities associated with an image would correspond to a different type of colorblindness. In this way, the colorblind accessibility quantity needed to re-rank the results would already be available for at least some images in the search results, and so would not have to be computed after the search.

1.2 Re-Ranking Search Results

Once the colorblind accessibility quantity is computed, the image search results can be re-ranked based on the accessibility. This can be accomplished in a number of ways. For example, in one embodiment, the re-ranking is accomplished by ordering the images discovered in the original relevance-ranked search by their colorblind accessibility quantity values in descending order.

It is also possible to combine the relevance scores for original ranking and the accessibility values to accomplish the re-ranking. For example, in one embodiment, a linear combination approach is used as follows:

$$NewRankScore = \beta \, RelevanceScore + (1-\beta) Accessibility \quad (7)$$

where NewRankScore is the score for reranking, Relevance Score is the score that was produced in the original ranking list, Accessibility is the colorblind accessibility quantity, and β is a weighting factor. It is envisioned that β can range between 0 and 1, depending on the application. Additionally, it is envisioned that other known combination methods could be employed, in lieu of the above-described linear method.

After obtaining NewRankScore, the images can be re-ranked with the scores in descending order.

It is also noted that not all the images found in the original search results have to be re-ranked. Instead, for example, the top K ranked images in the original search results could be selected for re-ranking, with the rest either being deleted in the re-ranked results or appended to the end of the re-ranked results and ordered according to their original relevance-based ranking.

It is further noted that the foregoing $\beta$ and K parameters can be prescribed, and in one implementation, these parameters are changeable and can be selected by the user. In another implementation, the user also has the choice of re-ranking the original search results using just the colorblind accessibility quantities, or the aforementioned combination of the relevance rankings and ranking based on the colorblind accessibility quantities.

2.0 The Search and Computing Environment

A general description of a suitable search environment in which the colorblind accessible image search technique embodiments described herein may be implemented will now be described, followed by a brief general description of a suitable computing environment in which the computing portions of the technique embodiments may be implemented.

Figure 3:
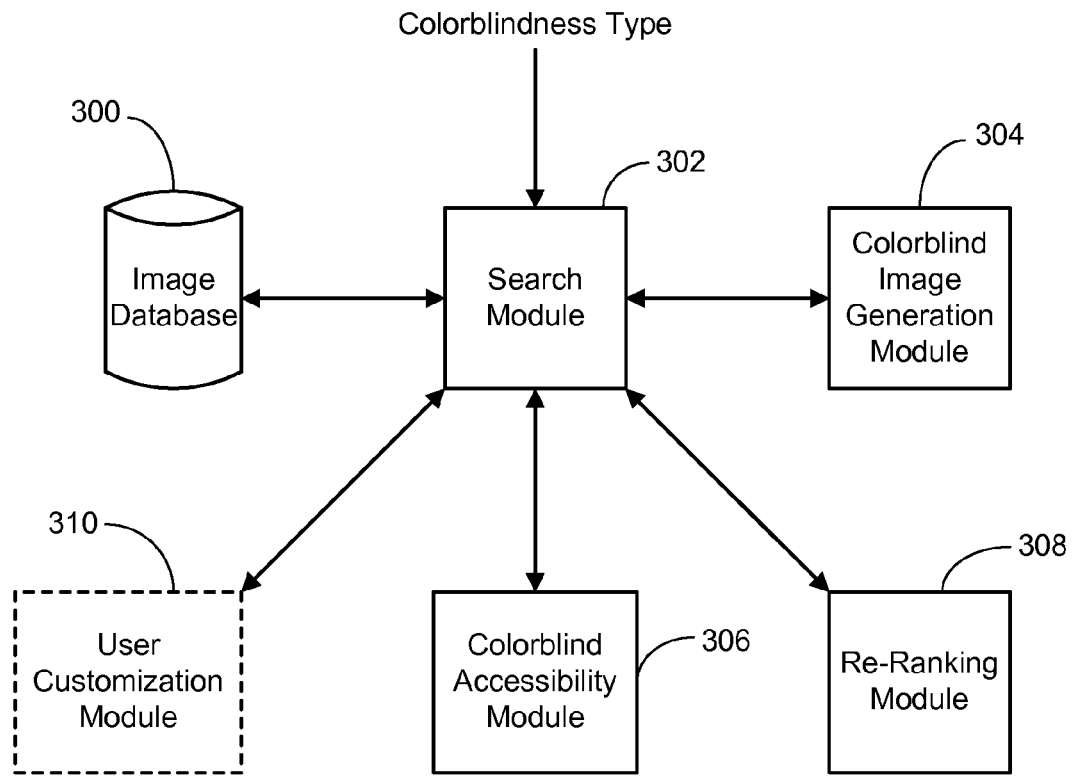
FIG. 3 is a block diagram illustrating a search environment suitable for implementing the process of FIG. 1.

Referring to FIG. 3, in one embodiment, the search environment includes an image database 300 which stores a searchable collection of images. It is noted that while a single database is shown, this can also be multiple databases that are in communication with each other. A search module 302 is used to process a user-generated image search request. This entails finding images matching the user's search criteria to some degree in the database and ranking them by their relevance to the criteria. The search module 302 obtains the images discovered in the search from the database 300. In addition to handling the user-generated image search request, the search module 302 also inputs a designation of the type of colorblindness the user suffers from. Based on this designation, the search module 302 employs a colorblind image generation module 304 to generate colorblind versions of the images discovered in the search. The search module 302 then employs a colorblind accessibility module 306 to compute the previously described colorblind accessibility quantity for images in the search results based on the associated colorblind versions of the images. It is noted that the colorblind image versions and the colorblind accessibility quantities can be computed for all the images found in the search, or some prescribed or user-specified number of the top-ranked results (as described previously).

The search module 302 then employs a re-ranking module 308 to re-rank the search results based on the computed colorblind accessibility quantities, and provide the re-ranked results to the user. As described previously, this can be accomplished in a number of ways, and can involve user-selected options. In regard to the user selection, if this implementation is employed a user customization module 310 is included to provide the selection data. The optional nature of the user customization module 310 is indicated in FIG. 3 by the use of a broken line box. As described previously, the user might designate that only a certain number of the top rank images found in the relevance-based search results are to be re-ranked. The user might also have the option to designate whether the re-ranking will be based on just the colorblind accessibility quantities, or a combination of the relevance rankings and the rankings derived from the colorblind accessibility quantities. Still further as described previously, the user might specify certain parameters (e.g., $\alpha$, $\beta$, Q). This can also be accomplished using the user customization module 310. It is also possible for the type of colorblindness designation mentioned previously to be input via the user customization module 310, rather than separately as shown in FIG. 3.

In the embodiment depicted in FIG. 3, the search module 302 plays the role of a central processing node. However, in alternate embodiments, one or more of the individual processing modules could act independently and provide their output to the module or modules requiring it as input. Additionally, in the depicted embodiment, the user selection data is input from the customization module 310 to the search module 302, with the search module providing the data to the appropriate processing module. However, in an alternate embodiment the user customization module 310 provides the selection data directly to the appropriate processing module.

For implementing those portions of the colorblind accessible image search technique embodiments described herein involving computations and processing, a suitable computing environment will now be described. The technique embodiments are operational with numerous general purpose or special purpose computing system environments or configurations. Examples of well known computing systems, environments, and/or configurations that may be suitable include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 4:
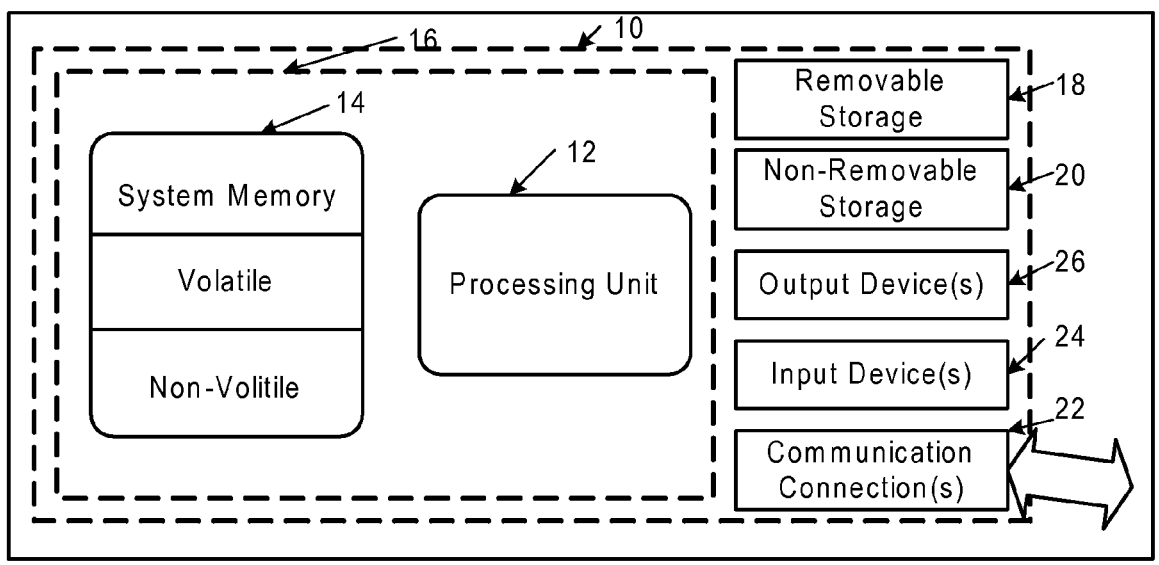
FIG. 4 is a diagram depicting a general purpose computing device constituting an exemplary system for implementing colorblind accessible image search technique embodiments described herein.

FIG. 4 illustrates an example of a suitable computing system environment. The computing system environment is only one example of a suitable computing environment and is not intended to suggest any limitation as to the scope of use or functionality of colorblind accessible image search technique embodiments described herein. Neither should the computing environment be interpreted as having any dependency or requirement relating to any one or combination of components illustrated in the exemplary operating environment. With reference to FIG. 4, an exemplary system for implementing the embodiments described herein includes a computing device, such as computing device 10. In its most basic configuration, computing device 10 typically includes at least one processing unit 12 and memory 14. Depending on the exact configuration and type of computing device, memory 14 may be volatile (such as RAM), non-volatile (such as ROM, flash memory, etc.) or some combination of the two. This most basic configuration is illustrated in FIG. 4 by dashed line 16. Additionally, device 10 may also have additional features/functionality. For example, device 10 may also include additional storage (removable and/or non-removable) including, but not limited to, magnetic or optical disks or tape. Such additional storage is illustrated in FIG. 4 by removable storage 18 and non-removable storage 20. Computer storage media includes volatile and nonvolatile, removable and non-removable media implemented in any method or technology for storage of information such as computer readable instructions, data structures, program modules or other data. Memory 14, removable storage 18 and non-removable storage 20 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 10. Any such computer storage media may be part of device 10.

Device 10 may also contain communications connection(s) 22 that allow the device to communicate with other devices. Device 10 may also have input device(s) 24 such as keyboard, mouse, pen, voice input device, touch input device, camera, etc. Output device(s) 26 such as a display, speakers, printer, etc. may also be included. All these devices are well known in the art and need not be discussed at length here.

The colorblind accessible image search technique embodiments described herein may be further described in the general context of computer-executable instructions, such as program modules, being executed by a computing device. Generally, program modules include routines, programs, objects, components, data structures, etc. that perform particular tasks or implement particular abstract data types. The embodiments described herein may also be practiced in distributed computing environments where tasks are performed by remote processing devices that are linked through a communications network. In a distributed computing environment, program modules may be located in both local and remote computer storage media including memory storage devices.

3.0 Other Embodiments

It is noted that any or all of the aforementioned embodiments throughout the description may be used in any combination desired to form additional hybrid embodiments. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Wherefore, what is claimed is:

1. A computer-implemented process for re-ranking the results of a relevance-ranked image search to account for the accessibility of the images to a colorblind person, comprising using a computer to perform the following process actions:
   inputting a designation of the type of colorblindness the colorblind person suffers from;
   obtaining results of a relevance-ranked image search;
   generating colorblind versions of images discovered in the search, said colorblind versions simulating how the associated images would appear to a person suffering from said type of colorblindness the colorblind person suffers from;
   computing a colorblind accessibility quantity for each image of interest in the search results based on the associated colorblind versions of the images, said colorblind accessibility quantity quantifying the degree to which color information is preserved when an image is perceived by a colorblind person viewing the image; and
   re-ranking the images of interest in the search results based at least in part on the computed colorblind accessibility quantities.

2. The process of claim 1, wherein the process action of computing a colorblind accessibility quantity for each image of interest in the search results, comprises the actions of:
   estimating the fraction of the loss of color information between the image and a colorblind version of the image; and
   defining the colorblind accessibility quantity for an image as one minus the estimated fraction of the loss of color information.

3. The process of claim 1, wherein the process action of re-ranking the images of interest in the search results based at least in part on the computed colorblind accessibility quantities, comprises an action of ordering the images of the search results by their associated colorblind accessibility quantity values in descending order.

4. The process of claim 1, wherein the process action of re-ranking the images of interest in the search results based at least in part on the computed colorblind accessibility quantities, comprises the actions of:
   identifying a number of the top ranked images in the image search results, wherein the number is less than all the images; and
   ordering the identified images of the search results by their associated colorblind accessibility quantity values in descending order.

5. The process of claim 4, wherein the number of top ranked images is user-specified.

6. The process of claim 1, wherein the process action of re-ranking the images of interest in the search results based at least in part on the computed colorblind accessibility quantities, comprises the actions of:
   ranking the images of the search results by their associated colorblind accessibility quantity values; and
   ordering the images of the search results in descending order based on a combined ranking score of each image, wherein the combined ranking score of an image is a combination of a relevance score of the image and the colorblind accessibility quantity of that image.

7. The process of claim 6, wherein said combination of the relevance score of the image and the colorblind accessibility quantity of that image is as a weighted linear combination computed using the equation NewRankScore=$\beta$ RelevanceScore+$(1-\beta)$ Accessibility, wherein NewRankScore is the combined ranking score, RelevanceScore is a relevance score based on which an original search ranking list was generated, Accessibility is the colorblind accessibility quantity, and $\beta$ is a weighting factor.

8. The process of claim 6, wherein the process of ordering the images of the search results in descending order based on the combined ranking score of each image is performed whenever it is specified by a user.

9. The process of claim 1, wherein the process action of re-ranking the images of interest in the search results based at least in part on the computed colorblind accessibility quantities, comprises the actions of:
   identifying a number of the top ranked images in the image search results, wherein the number is less than all the images;
   ranking the identified images of the search results by their associated colorblind accessibility quantity values; and
   ordering the identified images of the search results in descending order based on a combined ranking score of each image, wherein the combined ranking score of an image is a combination of a relevance score of the image and the colorblind accessibility quantity of that image.

10. The process of claim 9, wherein the number of top ranked images is user-specified.

11. A system for re-ranking the results of a relevance-ranked image search to account for the accessibility of the images to a colorblind user, comprising:
   a general purpose computing device;
   one or more image databases which are in communication with the computing device; and a computer program comprising program modules executable by the computing device, wherein the computing device is directed by the program modules of the computer program to,
  input a designation of the type of colorblindness the user suffers from,
  input results of a relevance-ranked image search,
  generate colorblind versions of images discovered in the search, said colorblind versions simulating how the associated images would appear to a person suffering from the designated the type of colorblindness,
  compute a colorblind accessibility quantity for each images of interest in the search results based on the associated colorblind versions of the images, said colorblind accessibility quantity quantifying the degree to which color information is preserved when an image is perceived by a colorblind person viewing the image,
  re-rank the images of interest in the search results based on a combination of the relevance rankings and rankings derived from the colorblind accessibility quantities, and
  provide the re-ranked results to the user.

* * * * *